United States Patent
Bertele

[15] 3,663,094
[45] May 16, 1972

[54] GALILEAN-TYPE TELESCOPE SYSTEM

[72] Inventor: Ludwig Bertele, Heerbrugg, Switzerland

[73] Assignee: Firma Wild Heerbrugg AG, Heerbrugg, Switzerland

[22] Filed: Aug. 10, 1970

[21] Appl. No.: 62,510

[52] U.S. Cl............................350/212, 350/215, 350/216, 350/220
[51] Int. Cl....................G02b 9/60, G02b 9/62, G02b 23/00
[58] Field of Search..............350/212, 175 E, 215, 216, 224

[56] References Cited

UNITED STATES PATENTS 3,059,532  10/1962  Harris et al. ............................350/212
2,433,438  12/1947  Cox ........................................350/224
2,440,088  4/1948   Grey.......................................350/212
2,730,017  1/1956   Tronnier..................................350/216
3,054,327  9/1962   Albrecht et al..........................350/212

*Primary Examiner*—John K. Corbin
*Attorney*—Werner W. Kleeman

[57] ABSTRACT

A Galilean-type telescope system comprising a negative system component and a positive system component. The negative system component embodies at least two air-spaced lens members and the positive system component embodies at least two air-spaced lens members, with the lens member disposed closer to the eye having negative refractive power and the following members having positive refractive power.

7 Claims, 5 Drawing Figures

GALILEAN-TYPE TELESCOPE SYSTEM

BACKGROUND OF THE INVENTION

The present invention relates to a new and improved Galilean-type telescope system by means of which there can be produced a stronger magnification or a wider field of vision in comparison with known constructional forms.

Such constructions consist of a system component having negative refractive power situated near the eye and a system component having positive refractive power facing the object. Since it is known that, with this lens sequence, the field of vision is greatly restricted by the virtual image formation of the pupil, the lens diameter in the positive system component must be chosen as large as possible in order to counteract this phenomenon. The bundle or pencils of light passing through the periphery of this lens intersect the optical axis on the eye side of the negative system component and, in this way, make possible a widening of the field of vision. For the purpose of sufficient image sharpness towards the edge of the image, it is just to these pencils of light that particular importance is attributed as regards the correction of the different image-forming defects.

SUMMARY OF THE INVENTION

Thus, a primary objective of the present invention is the provision of a new and improved Galilean-type telescope system which considerably obviates the above-mentioned defects.

Another significant object of the present invention relates to an improved Galilean-type telescope system which affords a stronger magnification or a wider field of vision in comparison with prior art constructions.

Now the just-mentioned defects can be largely obviated, and the advantages of the invention noted above realized, as well as others which will become apparent as the description follows, if in accordance with the teachings of the present invention, the negative system component consists of at least two air-separated lens members and the positive system component comprises at least two air-separated lens members, wherein the member disposed closer to the eye has negative refractive power and the following members have positive refractive power. The complete telescope system, which can be used as a telescope or telescopic magnifier, thus consists of at least four lens members separated by air spaces.

BRIEF DESCRIPTION OF THE DRAWINGS

The invention will be better understood and objects other than those set forth above, will become apparent when consideration is given to the following detailed description thereof. Such description makes reference to the annexed drawings depicting five illustrative examples of a short constructional form, wherein.

DETAILED DESCRIPTION OF THE PREFERRED EMBODIMENTS

Figure 1:
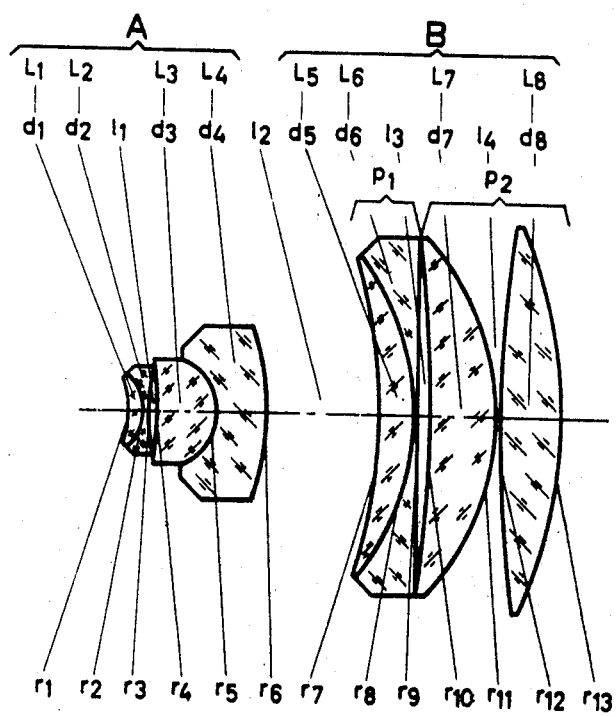
FIG. 1 schematically illustrates a first embodiment of inventive Galilean-type telescope system corresponding to the hereinafter given Example 1.

Describing now the drawings, in the various constructional forms of Galilean-type telescope system depicted therein, by way of example and not limitation, the system component having negative refractive power and situated near the side of the eye is designated by reference character A and the system component having positive refractive power facing the object is designated by reference character B.

Now, in the first three examples given herein, the first lens member $L_1-L_2$ of the telescope system, which is arranged on the side of the eye has its surface with stronger curvature facing the eye and is cemented together from two lenses, $L_1$ and $L_2$. The next following second lens member $L_3-L_4$ is a dispersing meniscus which bends towards the object and embodies two meniscus-shaped lenses $L_3$ and $L_4$. The third lens $L_5-L_6$ is a cemented member of negative refracture power $p_1$ and is followed by either two uncemented lens members $L_7$ and $L_8$ (FIGS. 1 and 3) or three uncemented lens members $L_7$, $L_8$ and $L_9$ (FIG. 2) of positive refractive power $p_2$.

For the astigmatic correction, it is advantageous for the air gap $l_1$ disposed between the first and second lens members to be given the form of a thin collecting lens or, in other words, the form of an air space which has a greater thickness in the optical axis than at the rim thereof. The same also applies as regards the small air space $l_3$ between the third and fourth lens members.

Now the example according to FIG. 1 represents a telescopic magnifier with five air-separated lens members. The focal length is 48 mm and the spacing of the object to be viewed from the lens surface 13 is 230 mm.

Figure 2:
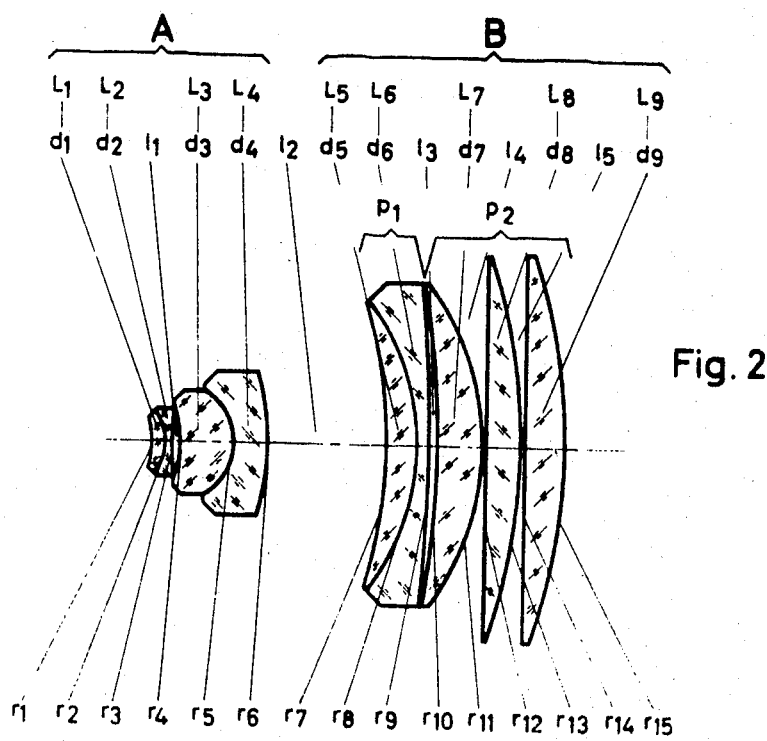
FIG. 2 schematically illustrates a second embodiment of inventive Galilean-type telescope system corresponding to the hereinafter given Example 2.

The example according to FIG. 2 is a telescopic magnifier with six air-spaced lens members. The focal length is 44.5 mm and the spacing of the object from the lens surface 15 is 201 mm.

Figure 3:
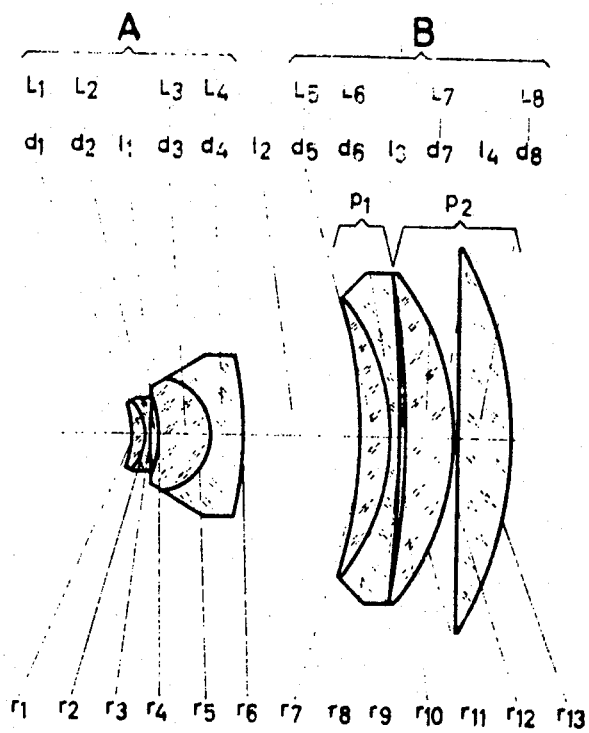
FIg. 3 schematically illustrates a third embodiment of inventive Galilean-type telescope system corresponding to the hereinafter given Example 3.

The example according to FIG. 3 is a telescope with five-fold magnification and having five air-spaced lens members.

Figure 4:
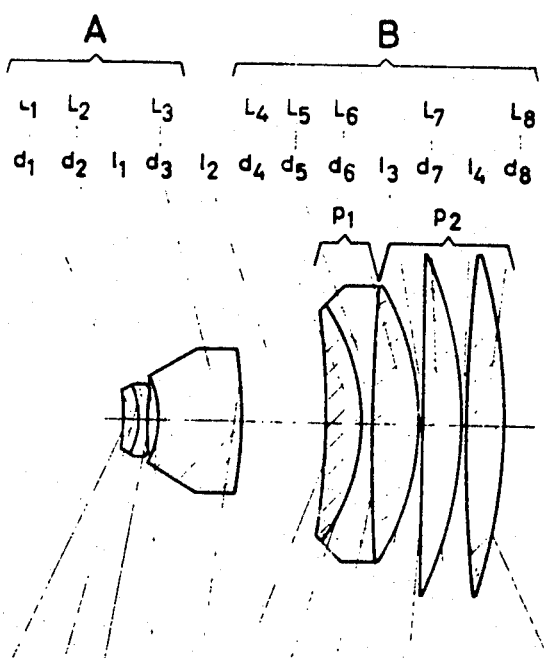
FIG. 4 schematically illustrates a fourth embodiment of inventive Galilean-type telescope system corresponding to the hereinafter given Example 4.

The example according to FIG. 4 shows a lens sequence for a three-fold magnification. It is sufficient here to construct the second lens member $L_3$ as a simple lens. The effect of the small air space $l_3$ which is provided in Examples 1 to 3 between the dispersing lens member $L_5-L_6$ ($p_1$) and the following lens $L_7$ is replaced by the same effect of a cemented surface $r_8$, which on the side of the eye has a refractive index clearly higher than on the object side. The focal length is 87.9 mm and the spacing of the object from the lens suface 13 is 300 mm.

Figure 5:
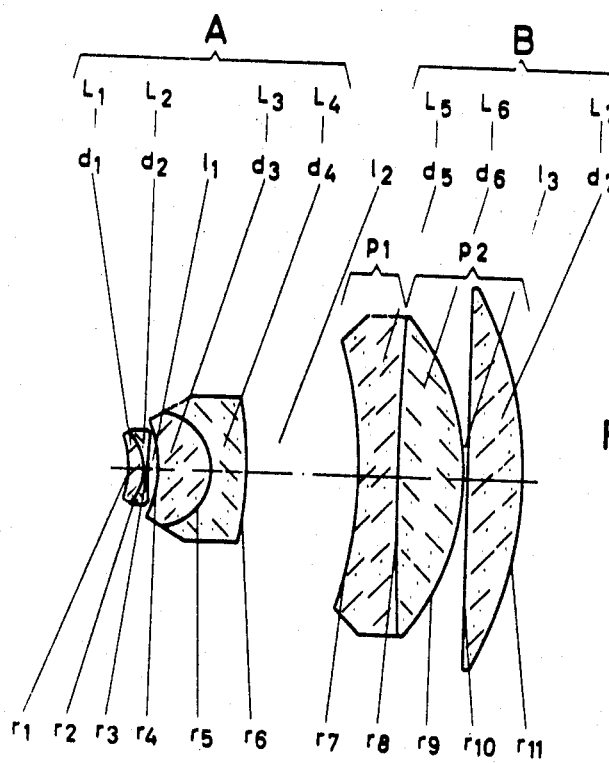
FIG. 5 schematically illustrates a fifth embodiment of inventive Galilean-type telescope system corresponding to the hereinafter given Example 5.

The example according to FIG. 5 is a telescope having five-fold magnification with four air-separated lens members $L_1-L_2$; $L_3-L_4$; $L_5-L_6$; and $L_7$. Here also, the effect of the air space $l_3$ in Examples 1 to 3 between the dispersing lens member $L_5-L_6$ ($p_1$) and the following lens $L_7$ is replaced by the same effect of a cemented surface $r_8$, which has a higher refractive index on the eye side than on the object side.

In order to guarantee in the entire range of the pupil a best possible image formation of the central image portions for a wide spectral region, the first lens member is cemented from a collective lens $L_1$ with high refractive index and strong color dispersion and a dispersing lens $L_2$ with lower refractive index and lower color dispersion.

The following tables show the optical data of the examples, and therein the symbols designate the following:

L the individual lenses,
r the radii of curvature of the individual surfaces,
d the axial thicknesses of the lenses,
l the air spaces between lenses,
$n_d$ the refractive indices for the helium d-line, and
Y the Abbe number.

The suffixes denote the particular item in sequence from the eye side of the telescope system.

EXAMPLE 1

|   |   |   | $n_d$ | Y |
|---|---|---|---|---|
| $L_1$ | $r_1 = -10.0$ | $d_1 = 1.8$ | 1.76182 | 26.5 |
| $L_2$ | $r_2 = -4.954$ | $d_2 = 0.7$ | 1.64050 | 60.1 |

| | | | $n_d$ | Y |
|---|---|---|---|---|
| | $r_3 = +25.22$ | | | |
| | $r_4 = -36.0$ | $l_1 = 0.8$ | | |
| $L_3$ | $r_5 = -6.48$ | $d_3 = 7.0$ | 1.52054 | 69.7 |
| $L_4$ | $r_6 = -29.96$ | $d_4 = 6.0$ | 1.72825 | 28.4 |
| | $r_7 = -60.0$ | $l_2 = 13.3$ | | |
| $L_5$ | $r_8 = -30.0$ | $d_5 = 4.0$ | 1.69100 | 54.7 |
| $L_6$ | $r_9 = -600.0$ | $d_6 = 1.0$ | 1.72825 | 28.4 |
| | $r_{10} = -149.2$ | $l_3 = 1.0$ | | |
| $L_7$ | $r_{11} = -30.13$ | $d_7 = 8.0$ | 1.64050 | 60.1 |
| | $r_{12} = +156.0$ | $l_4 = 0.2$ | | |
| $L_8$ | $r_{13} = -57.18$ | $d_8 = 7.5$ | 1.64050 | 60.1 |
| $r_{13}$ – Object = 230 | | $F = 48.1$ | | |

EXAMPLE 2

| | | | $n_d$ | Y |
|---|---|---|---|---|
| $L_1$ | $r_1 = -10.89$ | $d_1 = 1.65$ | 1.76182 | 26.5 |
| | $r_2 = -5.671$ | | | |
| $L_2$ | $r_3 = +48.67$ | $d_2 = 0.70$ | 1.62041 | 60.3 |
| | $r_4 = -13.003$ | $l_1 = 0.75$ | | |
| $L_3$ | $r_5 = -6.712$ | $d_3 = 6.5$ | 1.55232 | 63.5 |
| $L_4$ | $r_6 = -27.89$ | $d_4 = 4.0$ | 1.72825 | 28.4 |
| | $r_7 = -55.12$ | $l_2 = 13.9$ | | |
| $L_5$ | $r_8 = -27.64$ | $d_5 = 3.7$ | 1.6910 | 54.7 |
| $L_6$ | $r_9 = -178.5$ | $d_6 = 1.3$ | 1.72825 | 28.4 |
| | $r_{10} = -99.7$ | $l_3 = 0.8$ | | |
| $L_7$ | $r_{11} = -30.47$ | $d_7 = 5.5$ | 1.62041 | 60.3 |
| | $r_{12} = \infty$ | $l_4 = 0.15$ | | |
| $L_8$ | $r_{13} = -68.5$ | $d_8 = 4.6$ | 1.62041 | 60.3 |
| | $r_{14} = +577.6$ | $l_5 = 0.15$ | | |
| $L_9$ | $r_{15} = -68.5$ | $d_9 = 5.0$ | 1.62041 | 60.3 |
| $r_{13}$ – Object = 201 | | $F = 44.5$ | | |

EXAMPLE 3

| | | | $n_d$ | Y |
|---|---|---|---|---|
| $L_1$ | $r_1 = -10.89$ | $d_1 = 1.65$ | 1.76182 | 26.5 |
| | $r_2 = -5.671$ | | | |
| $L_2$ | $r_3 = +48.67$ | $d_2 = 0.70$ | 1.62041 | 60.3 |
| | $r_4 = -12.9$ | $l_1 = 0.75$ | | |
| $L_3$ | $r_5 = -6.71$ | $d_3 = 6.50$ | 1.55232 | 63.5 |
| $L_4$ | $r_6 = -40.0$ | $d_4 = 4.0$ | 1.72825 | 28.4 |
| | $r_7 = -55.12$ | $l_2 = 13.9$ | | |
| $L_5$ | $r_8 = -26.0$ | $d_5 = 3.7$ | 1.69100 | 54.7 |
| $L_6$ | $r_9 = -178.5$ | $d_6 = 1.3$ | 1.72825 | 28.4 |
| | $r_{10} = -99.7$ | $l_3 = 0.8$ | | |
| $L_7$ | $r_{11} = -30.77$ | $d_7 = 5.5$ | 1.65844 | 50.9 |
| | $r_{12} = \infty$ | $l_4 = 0.15$ | | |
| $L_8$ | $r_{13} = -44.35$ | $d_8 = 6.6$ | 1.65844 | 50.9 |

EXAMPLE 4

| | | | $n_d$ | Y |
|---|---|---|---|---|
| $L_1$ | $r_1 = -28.00$ | $d_1 = 1.6$ | 1.72325 | 23.4 |
| $L_2$ | $r_2 = -9.00$ | $d_2 = 0.8$ | 1.69100 | 54.7 |
| | $r_3 = +42.68$ | | | |
| | $r_4 = -11.00$ | $l_1 = 1.1$ | | |
| $L_3$ | $r_5 = -52.00$ | $d_3 = 10.5$ | 1.62041 | 60.3 |
| | $r_6 = -91.50$ | $l_2 = 9.2$ | | |
| $L_4$ | $r_7 = -23.00$ | $d_4 = 4.0$ | 1.64050 | 60.1 |
| $L_5$ | $r_8 = +235.00$ | $d_5 = 1.5$ | 1.75693 | 31.8 |
| $L_6$ | $r_9 = -30.05$ | $d_6 = 5.5$ | 1.51011 | 64.2 |
| | $r_{10} = \infty$ | $l_3 = 0.2$ | | |
| $L_7$ | $r_{11} = -47.10$ | $d_7 = 4.5$ | 1.49500 | 57.5 |
| | $r_{12} = +180.00$ | $l_4 = 0.2$ | | |
| $L_8$ | $r_{13} = -67.50$ | $d_8 = 4.5$ | 1.49500 | 57.5 |

EXAMPLE 5

| | | | $n_d$ | Y |
|---|---|---|---|---|
| $L_1$ | $r_1 = -10.89$ | $d_1 = 1.65$ | 1.76182 | 26.5 |
| | $r_2 = -5.67$ | | | |
| $L_2$ | $r_3 = +48.67$ | $d_2 = 0.70$ | 1.62041 | 60.3 |
| | $r_4 = -12.90$ | $l_1 = 0.75$ | | |
| $L_3$ | $r_5 = -6.71$ | $d_3 = 6.50$ | 1.55232 | 63.5 |
| $L_4$ | $r_6 = -40.00$ | $d_4 = 4.00$ | 1.72825 | 28.5 |
| | $r_7 = -51.30$ | $l_2 = 13.20$ | | |
| $L_5$ | $r_8 = +335.00$ | $d_5 = 4.70$ | 1.71736 | 29.5 |
| $L_6$ | $r_9 = -28.50$ | $d_6 = 8.00$ | 1.51680 | 64.2 |
| | $r_{10} = \infty$ | $l_3 = 0.15$ | | |
| $L_7$ | $r_{11} = -44.35$ | $d_7 = 6.60$ | 1.69100 | 54.7 |

What is claimed is:

1. A Galilean-type telescope system, comprising a negative system component and a positive system component, said negative system component comprising at least two dispersing lens members separated from one another by a small air space situated close to the eye and in the form of a positive lens, said positive system component comprising at least three air-spaced lens members, wherein the lens member situated closest to the eye has negative refractive power and the following lens members have positive refractive power.

2. The telescope system as defined in claim 1, wherein said lens member of said positive system component situated closest to the eye is a dispersing lens member and the following lens members of the said positive system component comprise at least two collective lens members, and wherein said dispersing lens member and said following collective lens members of said positive system component are separated from one another by an air space in the form of a thin collecting lens.

3. The telescope system as defined in claim 1, wherein the dispersing lens member of said negative system component which faces away from the eye is a dispersing meniscus which bends towards the object.

4. The telescope system as defined in claim 1, wherein the dispersing lens member of said two dispersing lens members of said negative system component which is situated closest to the eye has a more strongly curved surface facing the eye.

5. The telescope system as defined in claim 1, wherein said dispersing lens member located closest to the side of the eye comprises a meniscus-shaped collective lens with high refractive index and strong color dispersion and a dispersing lens with lower refractive index and lower color dispersion than said collective lens.

6. A telescope system, comprising a negative system component and a positive system component, said negative system component comprising at least two dispersing lens members spaced from one another by an air space close to the eye which is in the form of a positive lens, said positive system component comprising a dispersing lens member followed by three collective lens members, the collective lens member of said three collective lens members situated closest to the side of the eye being cemented with said dispersing lens member and wherein the refractive index of the cemented surface at the side of the eye is considerably greater than at the side of the object.

7. The telescope system as defined in claim 6, wherein said lens member of said negative system component which faces away from the eye is a dispersing meniscus bent towards the object.

* * * * *